UNITED STATES PATENT OFFICE.

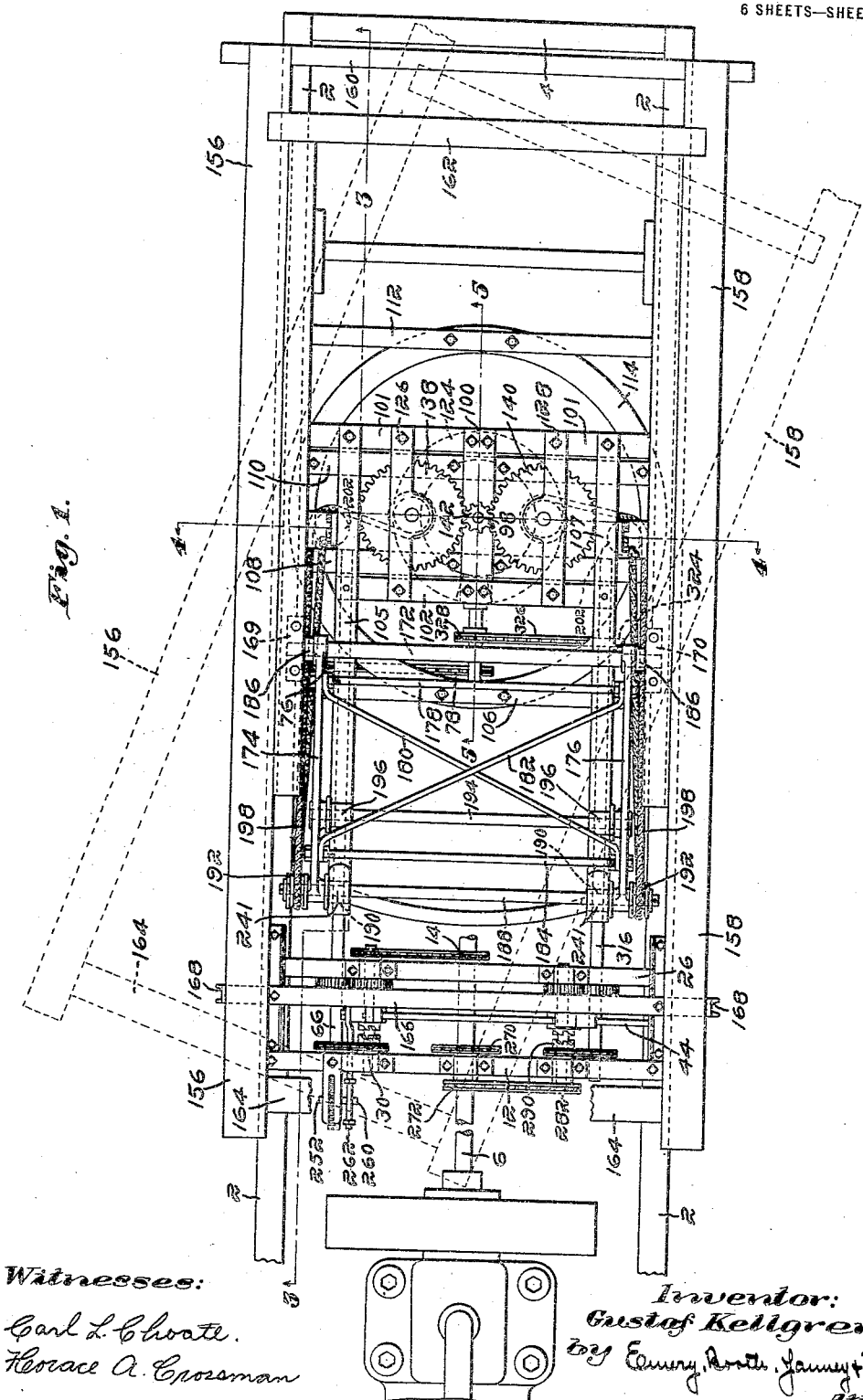

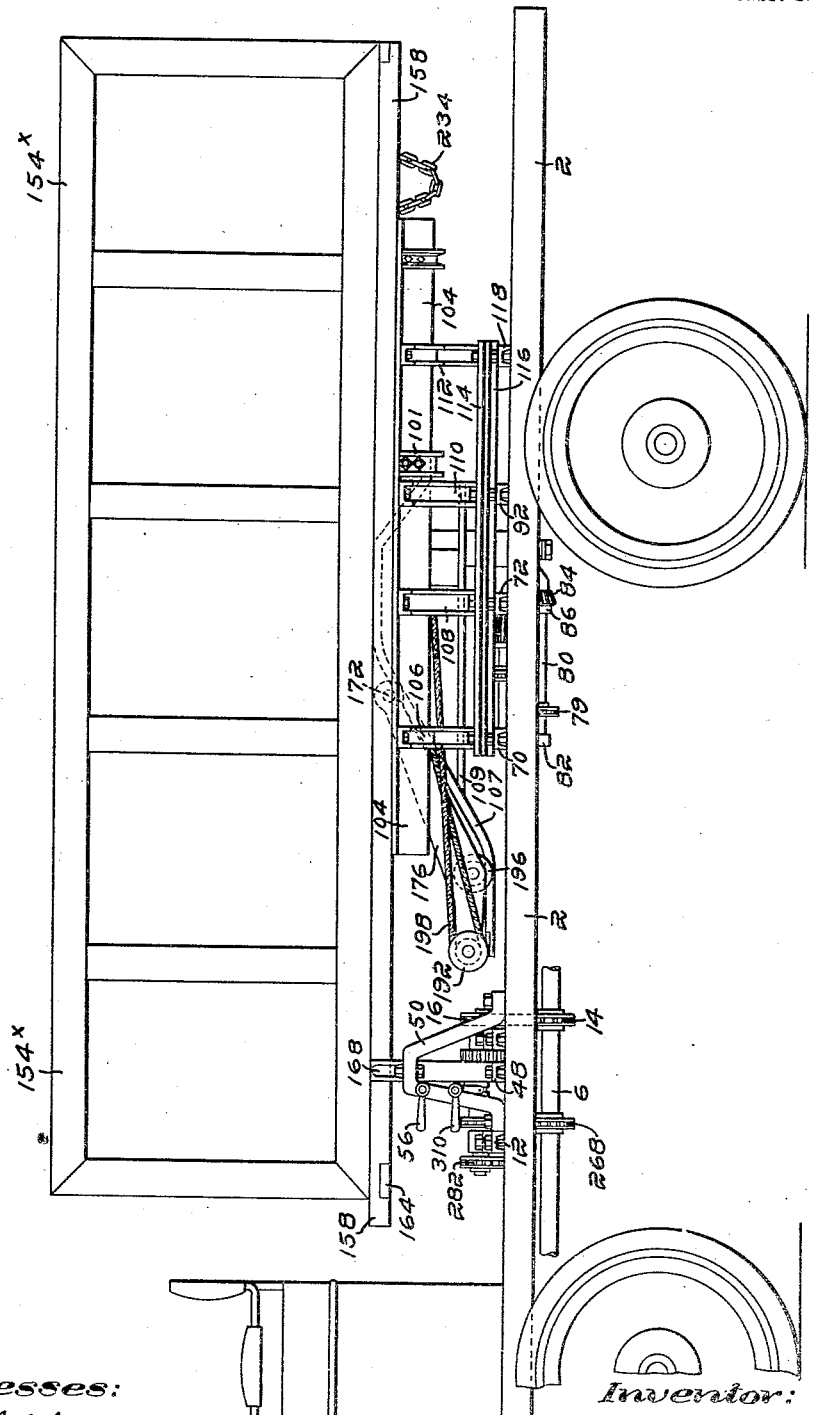

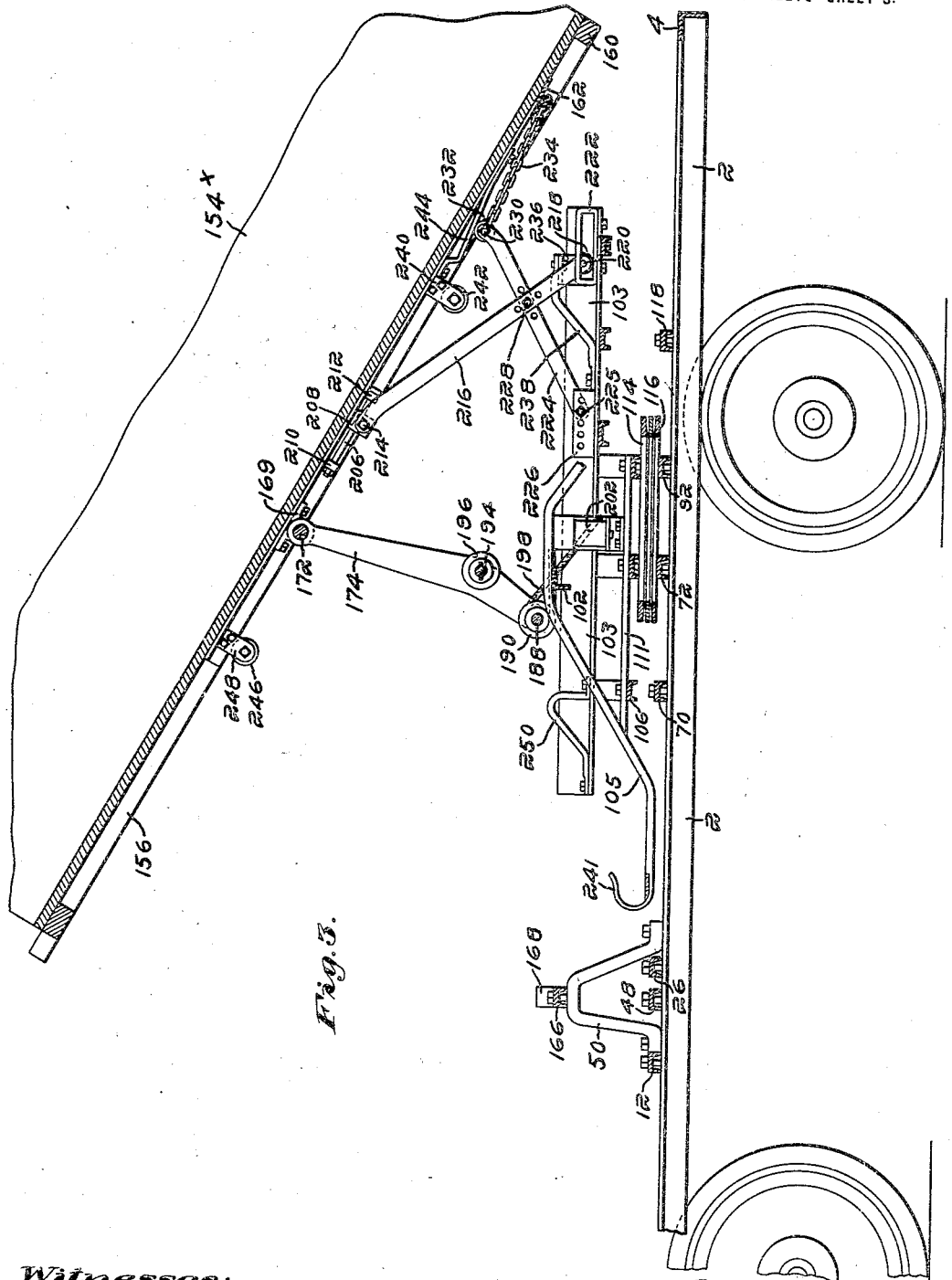

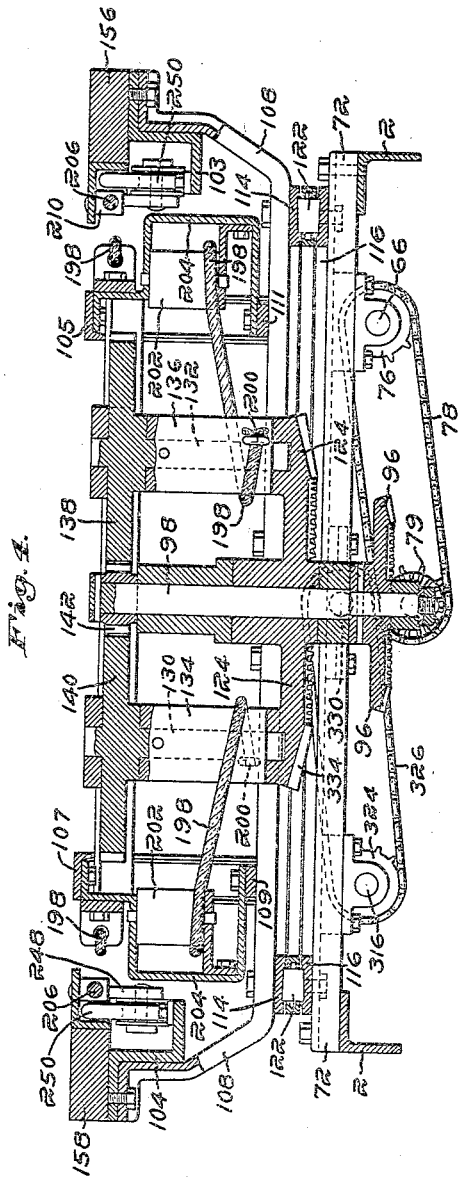

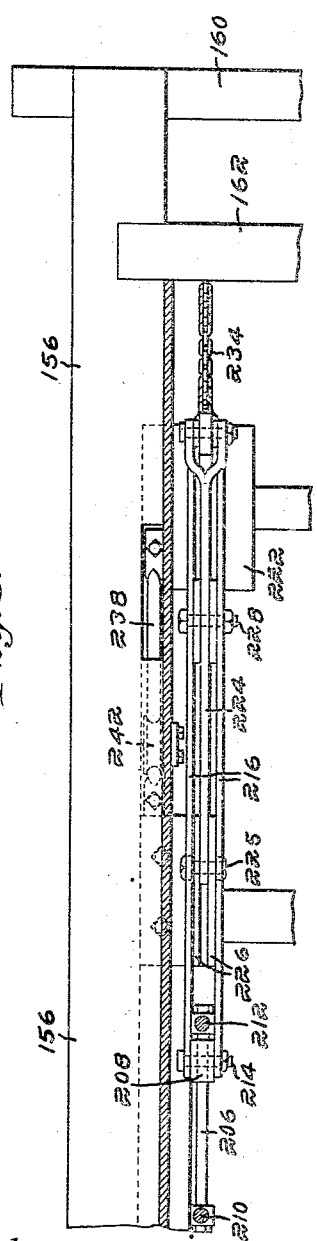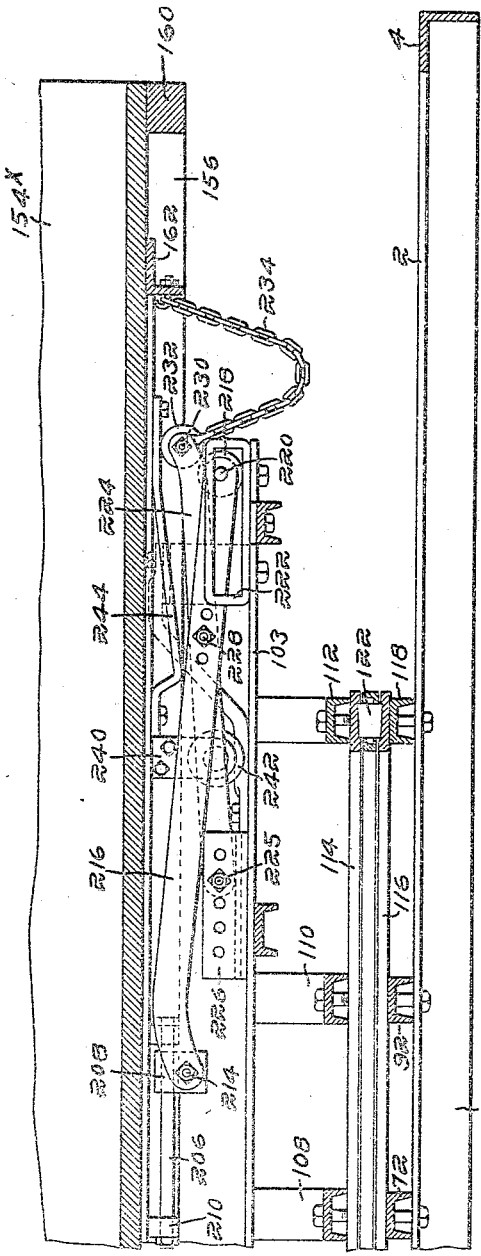

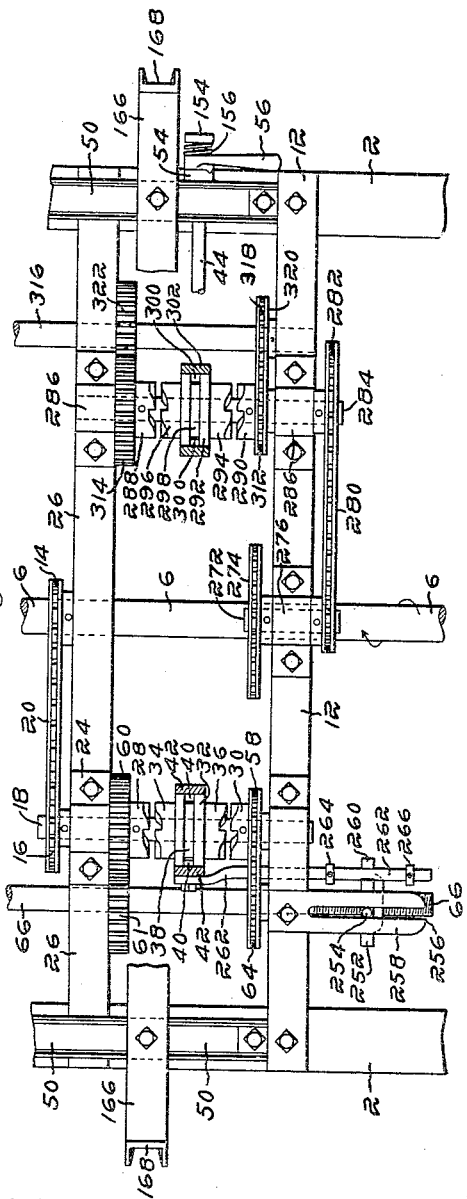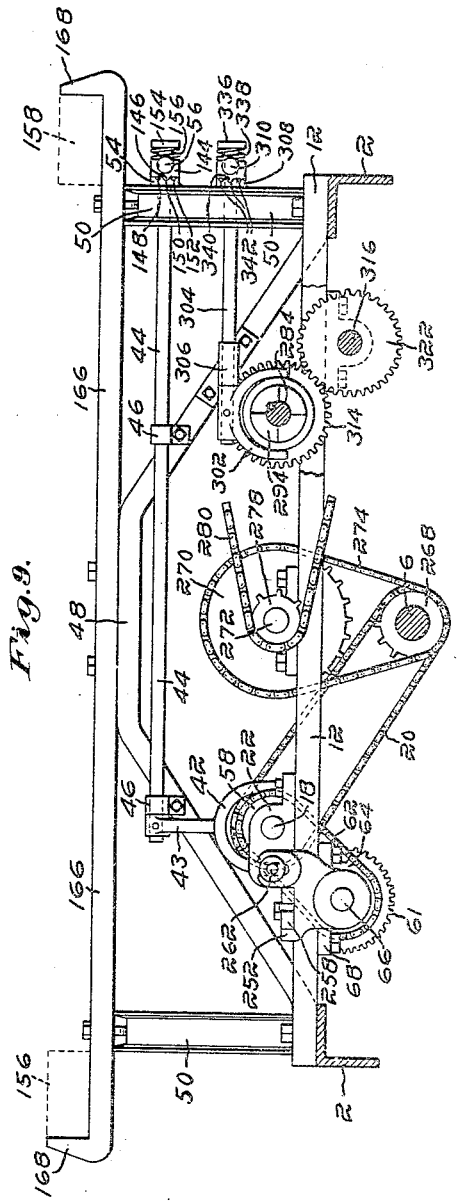

GUSTAF KELLGREN, OF BOSTON, MASSACHUSETTS.

LOAD-HANDLING APPARATUS.

1,168,811.  Specification of Letters Patent.  Patented Jan. 18, 1916.

Application filed June 7, 1913. Serial No. 772,243.

*To all whom it may concern:*

Be it known that I, GUSTAF KELLGREN, a citizen of the United States, and a resident of Boston, county of Suffolk, and State of Massachusetts, have invented an Improvement in Load-Handling Apparatus, of which the following description, in connection with the accompanying drawings, is a specification, like characters on the drawings representing like parts.

This invention relates to load handling apparatus.

The objects and features of the invention will best be understood from the following description taken in connection with the accompanying drawings of a vehicle embodying one form of said invention and selected for the purpose of illustration, it being understood that the invention in its true scope is definitely set forth by the claims.

In the drawings: Figure 1 is a plan view of a motor vehicle embodying one form of the invention; Fig. 2 is a side elevation thereof; Fig. 3 is a vertical longitudinal section on line 3—3 of Fig. 1, but showing the body in elevated position; Fig. 4 is a vertical cross section on line 4—4 of Fig. 1; Fig. 5 is a vertical longitudinal section on line 5—5 of Fig. 1; Fig. 6 is a detail plan view; Fig. 7 is a detail sectional elevation; Fig. 8 is a plan view of the clutch mechanism, parts being broken away to show the construction beneath; Fig. 9 is a side elevation of the parts shown in Fig. 8.

In the drawings, the invention is shown in its application to a delivery or dumping vehicle and more particularly to a power operated vehicle of that type, but it will be apparent that as to some of its features it is susceptible of a variety of other applications without departing from the spirit of the invention.

The chassis of the vehicle shown may be of any usual and suitable construction and comprises herein the two longitudinally disposed and spaced angle irons 2—2 connected by the usual transverse members, two of which are shown at 4, 4. The driving shaft 6 is mounted in any suitable manner and may be driven as usual from the crank shaft of the engine through a suitable clutch. The engine and clutch above referred to form no part of the present invention and will, therefore, not be shown nor described, they being in any suitable location and constructed and operated in any suitable and usual manner.

One preferred form of mechanism for raising and tilting the body will now be described, it being understood that the invention is not limited to the specific arrangement nor details of parts herein shown. Upon the shaft 6 there is mounted a sprocket wheel 14, Figs. 8 and 9. A second sprocket wheel 16 is fixed upon the rear end of a shaft 18 and is driven from the sprocket wheel 14 by means of a sprocket chain 20. The shaft 18 extends parallel to the shaft 6 and is journaled in bearings 22, 24, the former of which is mounted upon a bracket strip 12 and the latter upon a bracket strip 26, both bracket strips being parallel and being secured in any suitable manner at their opposite ends upon the longitudinal angle irons 2 of the chassis. Upon the shaft 18 are loosely mounted two clutch members 28 and 30, and intermediate said clutch members there is splined upon said shaft a collar 32 in such manner that said collar 32 is compelled to rotate with said shaft but is capable of longitudinal movement thereon. Said collar 32 is provided with two clutch members 34, 36, the former of which is adapted to coöperate with the clutch member 28 and the latter with the clutch member 30. The collar 32 is provided with an annular groove 38 engaged by studs 40, 40 provided in the ends of a yoke 42, having an arm 43 fixed to a shaft 44 journaled in bearings 46, 46 provided upon a bent bar 48 extending transversely of the machine and secured at its opposite ends in any suitable manner to the longitudinal angle irons 2 of the chassis. Adjacent its outer end, the shaft 44 is journaled in a bearing 54 upon one of two standards 50, 50, which standards are secured in any suitable manner upon the angle irons 2, 2 at opposite sides of the chassis. To the outer end of the shaft 44 is secured a handle 56.

The clutch member 30 is provided with a sprocket wheel 58 herein formed integral therewith and the clutch member 28 is provided with a gear 60 herein also formed integral therewith. The sprocket wheel 58 is operatively connected, by means of a sprocket chain 62, with a sprocket wheel 64 fixed upon a shaft 66 extending longitudinally of the machine and journaled in suitable bearings provided on the under side of the bracket strip 12 and U-irons 70 and 72, these latter being secured at their opposite ends to the longitudinal angle irons 2 of the chassis. The gear 60 meshes with a gear 61 fast on the shaft 66. Upon said shaft 66 there is secured a sprocket wheel 76 which is operatively connected by means of a sprocket chain 78 with another sprocket wheel 79 fast upon a shaft 80 extending longitudinally of the machine and journaled adjacent to one of its ends in a bearing provided in a bracket 82 depending from the under side of the U-iron 70, Figs. 4 and 5. Adjacent its other end said shaft is provided with a beveled gear 84 and is journaled adjacent said gear in a bearing provided in a bracket 86 depending from a supporting member 88 secured to the under side of the transverse U-iron 72 and U-iron 92, the latter extending parallel to the U-iron 72 and secured at its opposite ends upon the longitudinal angle irons 2 of the chassis. The rear end of the shaft 80 is journaled in a bearing provided in a bracket 94 depending from the transverse U-iron 92. The beveled gear 84 meshes with a beveled gear 96 secured in any suitable manner to a vertical shaft 98 journaled at its lower end in an enlarged portion of the bracket 94 and at its upper end in a bracket 100 extending longitudinally of the machine and secured at one end to a U-bar 101 and at its other end to an angle iron 102. The U-bar 101 is secured at its opposite ends to Z-bars 103, 104, Figs. 4 and 5, extending longitudinally of the machine and secured in any suitable manner to the ends of U-irons 106, 108, 110 and 112 extending transversely of the machine. The angle iron 102 is secured at its opposite ends to two rails 105, 107 the function of which will be hereinafter more fully described. These rails are bolted at one end to the U-bar 101 and adjacent their other ends to two bars 109, 111 bolted upon the U-irons 106, 108, 110, 112. The U-irons 106, 108, 110, 112 are secured in any suitable manner to a bearing ring 114 mounted for rotation upon another bearing ring 116 secured in any suitable manner upon the transverse U-irons 70, 72, 92, 118, suitably arranged roller bearings 122 being preferably interposed between the bearing surfaces of the two bearing rings 114, 116. The bearing rings 114, 116 constitute a turn table as will be hereinafter more fully described.

To the under side of the U-irons 108, 110, is suitably bolted a disk 124, Figs. 4 and 5. In the upper surface of said disk 124 at two diametrically opposed points thereof, are journaled the lower ends of two vertical shafts 130, 132, Fig. 4, having their upper ends journaled in lateral bearings provided on two brackets 126, 128, Fig. 1, secured at their opposite ends upon the U-bar 101 and angle iron 102. To the shafts 130, 132 are secured drums 134, 136, and adjacent their upper ends said shafts have secured thereto gears 138, 140, both of which mesh with a pinion 142 secured to the upper end of the vertical shaft 98.

From the above described construction, it will be apparent that with the collar 32 in the position shown in Fig. 8, that is to say, its intermediate position, said collar will be rotated idly from the main shaft 6 through the sprocket wheel 14, sprocket chain 20, sprocket wheel 16 and shaft 18. If now, the handle 56 upon the rod 44 be turned clockwise, the clutch member 36 will by means of the yoke 42 be thrown into engagement with the clutch member 30. This will cause the sprocket wheel 58 to be rotated in a clockwise direction, thus effecting clockwise rotation of the shaft 66 through the sprocket chain 62 and sprocket wheel 64. This clockwise rotation of the shaft 66 will, through the sprocket chain 78 and sprocket wheel 79, effect rotation of the shaft 80 and beveled gear 84 in the same direction as the shaft 66, and the beveled gear 84 by its engagement with the beveled gear 96 will, through said last named beveled gear, shaft 98, pinion 142 and gears 138 and 140, effect rotation of the drums 134, 136. If, on the other hand, the handle 56 be turned in a contra-clockwise direction, the collar 32 will be moved in the opposite direction upon the shaft 18 through the rod 44 and yoke 42, thus bringing the clutch member 36 out of engagement with the clutch member 30 into neutral position, so that rotation of the drums 134, 136 will cease. If the handle 56 be further turned in the same direction, it will be apparent that the clutch member 34 will be brought into engagement with the clutch member 28, thus producing rotation of the shaft 66 through the intermeshing gears 60, 61 in the opposite direction to that in which said shaft is rotated when the clutch member 36 is in engagement with the clutch member 30. Rotation of the shaft 66 by engagement of the clutch members 34 and 28 will thus, through the connections previously described, effect rotation of the drums 134, 136, each in a reverse direction to that in which it is rotated when the clutch members 36 and 30 are in engagement.

The hub 144 of the handle 56 is preferably splined upon the outer end of the rod 44 so as to be capable of longitudinal movement on said rod and still adapted to turn the same, and said hub is preferably provided with a tooth 146 adapted to engage in any one of three notches 148, 150, 152 provided in the bearing 54. Between the hub 144 and a collar 154 attached to the outer ends of the rods 44, there is provided a helical spring 156 which tends to press the hub 144 toward the bearing 54 to cause said tooth 146 to engage that one of the notches 148, 150, 152 opposite which said tooth happens to be. These three notches correspond to the three positions above described of the collar 32 and assist in maintaining said collar in its intermediate position and in either one of its extreme positions, in one of which latter two positions the clutch member 34 is in engagement with the clutch member 28 and in the other of which it is in engagement with the clutch member 30.

The body 154× may be of any usual construction and herein is supported upon a frame comprising the longitudinal members 156, 158 and the transverse members 160, 162 and 164. In its normal depressed position the body is sustained by the upper surfaces of the two longitudinal Z-bars 103, 104 and by a transverse sustaining bar 166, Figs. 1 and 9, bolted upon the standards 50, 50 and bent bar 48 located near the front of the machine and already referred to. The bar 166 has upturned ends 168, 168 to engage the outer edges of the two longitudinal members 156, 158 of the frame of the body when said body is in its lowered position so as to contribute to prevent lateral movement of said body in its depressed position. In its depressed position, the longitudinal center of the body will preferably be somewhat in advance of the vertical shaft 98 about which the turn table and body are adapted to rotate as will be hereinafter more fully explained. In this manner the excess weight in advance of said shaft tends to restrain the body against vertical displacement or jouncing when the vehicle is in motion.

To the longitudinal frame members 156, 158 are suitably attached bearings 169, 170, in which are journaled the opposite ends of a shaft 172. This shaft is loosely embraced adjacent its two ends by the hubs of two bent or angular push bars 174, 176 suitably braced and spaced by rods 178, 180, 182 and 184. Collars 186, 186 prevent movement of the hubs of the bars 174, 176 longitudinally of the shaft 172, said collars being loosely mounted upon said shaft between the hubs of said bars and the bearings 169, 170. At their lower ends, the bars 174, 176 are provided with hubs which embrace loosely a rod 188 adjacent its two ends, the hub of each rod being located between a flanged smooth faced roller 190 and a peripherally grooved roller 192, said rollers being rotatably mounted upon the shaft 188 in any suitable manner and they and the hubs of the bars 174, 176 being secured against longitudinal displacement on said shaft in any usual manner as by a cotter pin passing through said shaft outside of each peripherally grooved roller 192 and a pin (not shown) in said shaft adjacent the outer lateral face of each of the smooth faced rollers 190, 190. Nearer their lower ends each one of said bars 174, 176 is joined by a shaft 194 upon which is rotatably mounted in line with the rollers 190 a flanged roller 196, said rollers being secured against longitudinal movement upon the shaft 194 in any suitable manner. Flexible steel cables 198, 198 are secured at one end in any suitable manner to the surface of the drums 134, 136 adjacent their lower ends, as for example, to ears 200, 200 provided upon said drums. Said flexible cables 198 pass over guide rollers 202, 202 mounted in any suitable manner for rotary movement in brackets 204, 204 bolted in any suitable manner to the upper surface of the bars 109, 111, and the under surface of the rails 105, 107. From said rollers 202, said flexible cables pass about the peripherally grooved rollers 192 and thence back to the brackets 204, 204 to which their free ends are secured in any suitable manner.

To each of the longitudinal frame members 156, 158 of the body there is secured in any suitable manner a guide rod 206. Upon each of these rods there is slidingly mounted a block 208, movement of said block being limited by collars 210, 212 at either end of each rod. To each of the blocks 208 there is pivotally attached at 214 one end of a link 216 composed of two parallel flat bars having the block 208 between their upper ends and a roll 218 rotatably mounted between their lower ends upon a pin 220. The lower ends pass through a guide slot extending longitudinally in the upper plate of a guide frame 222, one of which guide frames is bolted in any suitable manner to the lower horizontal portion of the Z-iron 103 and the other to the corresponding portion of the Z-iron 104. The roll 218 rolls upon the bottom plate of the guide frame 222 and the pin 220 is prolonged at either side of the roll so as to extend under the edges of the guide slot provided in the top plate of said guide frame and thus prevent the roll from escaping from the latter.

Links 224 have their lower ends pivoted, as by bolts 225 to brackets 226, one mounted in any suitable manner upon the lower horizontal portion of the Z-iron 103 and the other on the corresponding portion of the Z-iron 104, and each of said links is pivoted as by bolts 228 to its corresponding link 216 between the two flat bars forming the latter. The brackets 226 are each provided with a plurality of apertures each adapted to receive the corresponding bolt 225, and the links 216 and 224 are similarly each provided with a plurality of apertures each adapted to receive the corresponding bolt 228. The upper ends of the links 224 are provided with pins 230 carrying rolls 232, and to said pins are attached by one end chains 234, the other end of which is attached in any suitable manner to the cross bar 162 of the body frame.

Upon the lower horizontal portion of each of the Z-irons 103, 104, there is mounted a bracket 236. To each one of these brackets is securely fastened in any suitable manner the upper end of an inclined guide rail 238, the lower end of which is bolted or otherwise secured to the horizontal portion of the Z-iron. These two inclined guide rails are located in the same transverse vertical plane of the machine, the whole construction being clearly shown in the case of the one mounted on the Z-iron 103 in Fig. 3. Upon each of the longitudinal frame members 156, 158 of the body, there is bolted or otherwise secured in any suitable manner a bracket 240 carrying a roll 242, as clearly shown in the case of the frame member 156 in Fig. 3, said rolls being adapted to coöperate with the guide rails 238.

From the construction so far described, it will be apparent that if the main shaft 6 is being driven by the engine in a clockwise direction, Fig. 9, and the clutch members 36 and 30 be thrown into engagement, the steel cables will, through the mechanical connections already described, be wound up on the drums 134, 136, the body being at this time supposed to be in its lowest position with the rollers 190 of the bent bars 174, 176 upon the lower horizontal portion of the rails 105, 107 and underneath upwardly and rearwardly bent end portions 241 of said rails whereby the body of the vehicle is further secured against vertical oscillation or movement when the vehicle is in motion.

As the steel cables 198, 198 are wound upon the drums 134, 136, the rollers 196 move up the inclined portion of the rails 105, 107 and the rolls 242, 242 move up the inclined guide rails 238, the relative inclination of the rails 105, 107 and the guide rails 238 being such that the body of the vehicle thus moves upwardly and backwardly while maintaining a substantially horizontal position until the rolls 242 have reached the end of the inclined guide rails 238 and the blocks 208 on the upper end of the links 216 contact with the collars 210 of the guide rods 206. This preliminary upward and rearward movement of the body has two principal objects: first, it brings the push bars 174, 176 into a more rectangular position with relation to the horizontal plane of the bottom of the body by the time that the rollers 190 reach the beginning of the inclined portion of the rails 105, 107 and the actual rearward tilting of the body begins, thus greatly facilitating the tilting of the body by reducing the power required to effect such tilting, and secondly, the longitudinal center of the body which, as already explained, is in advance of the vertical shaft 98 when the body is in its normal lowered position, is brought substantially above said shaft, so that the longitudinal and transverse center of the body coincides substantially with the vertical axis of the shaft 98 and as this is the shaft about which the body is turned in its turning movement, said turning movement to be hereinafter described is effected with great facility and without any danger of tipping, owing to the substantially perfect balance thus obtained for the load upon the turn table.

In the further operation, the rollers 190 commence to move up along the inclined portion of the rails 105, 107, thus causing the body to be gradually tilted more and more toward the rear of the machine, any rearward sliding of the body being prevented by the chains 234 which connect the body to the upper ends of the links 224. As the body is tilted more and more, the lower ends of the links 216 are drawn backwardly, that is to say, toward the front of the machine in their guide frame 222 and the upper ends of the links 224 are thus gradually raised, so that the rolls 232 upon the upper ends of said links 224 act on inclined cam members 244, one of which is secured in any suitable manner to each of the longitudinal frame members 156 and 158 of the body in such manner that while the fore part of the body is raised to a considerable height, the rear end of the body is also raised, but to a considerably less extent, or at least, is not substantially lowered. This is of importance as it enables the body to be turned upon the turn table even with the body in its extreme tilted position, without any danger of interference with the wheels or other parts of the vehicle, to discharge a load from either side of the vehicle. The body is shown in its raised position in Fig. 3. By suitably adjusting the pivot bolts 225 and 228 the nature and extent of the movement of the rear end of the body may be varied in accordance with desire or requirement.

If desired, the rollers 196 may be dispensed with and the same result obtained by providing rolls 246, 246 mounted in brackets 248, 248 secured to the longitudinal frame members 156, 158, said rolls being adapted to coöperate with inclined guide rails 250, 250 mounted in suitable position upon the lower horizontal portion of the Z-irons 103, 104. In such case, rectilinear push bars may be substituted for the angular push bars 174, 176. By the use of the latter push bars, however, the rollers 196 and 190, which constitute abutment members through which the force is applied as a reaction upon the support, are brought successively into engagement with the guide rails 105 so as to become successively operative. Referring to Figs. 3 and 5, it will be seen that the straight line connecting the axis of the pivot 172 with the axis of the roller 196, and corresponding to one arm of the push bar, forms an angle with the line connecting the axis of said pivot with the axis of the roller 190 and corresponding to another and longer arm of the push bar. The first of these lines represents the direction of the application of the lifting force to the body when the roller 196 is in operative engagement with its guide rail 105, namely, when the body is in a relatively low position, as shown in Fig. 5, while the second of these lines represents the direction of application of said force when the roller 190 is operative, that is to say, when the body is in a relatively elevated position, as shown in Fig. 3. The first of these lines is more nearly normal to the body when said body is depressed, while the second is more nearly normal to said body when the latter is elevated. The first of these lines, however, corresponds to an arm of the push bar, defined by the roller 196, which is operative during the first part of the tilting movement of the body, while the second of these lines represents a longer arm, defined by the roller 190, which is rendered operative when the roller passes out of engagement with the guide rail 105 as the body is elevated. It will therefore be seen that, by the use of the plurality of successively operative rollers 196 and 190, the lifting or tilting force is applied to the body through the push bars in a direction approximately normal to said body irrespective of the angular position of the latter, and through arms of said push bars corresponding in length to the elevation of said body, so that the effective moment of said force, tending to elevate said body, is at all times approximately constant and at a maximum.

To lower the body, it is only necessary to throw the clutch members 28 and 34 into engagement whereupon rotation of the shaft 6 will, through the connections already described, cause rotation of the drums 134, 136 in reverse direction and the weight of the body will cause the steel cables to be unwound therefrom and the body to be lowered into its normal horizontal position.

Means may be provided in accordance with the present invention to disconnect the clutches 30, 36 and 28, 34 when the body has been hoisted into a sufficiently tilted position or has reached its normal lowered position, respectively. In the embodiment of the invention shown, this stop means comprises a screw-threaded carriage 252 having screw-threaded engagement with a left hand thread provided upon the outer or forward end of the shaft 66, see Figs. 1 and 8; said carriage is provided with an upwardly extending pin 254 which engages a longitudinal guide slot 256 provided in a guide 258 secured in any suitable manner to the bracket strip 12. The carriage 252 is provided with a horizontally extended abutment 260 which extends rectangularly to and under a rod 262 secured at one end in any suitable manner to the collar 32 and provided with two collars 264, 266 adjustable longitudinally of said rod and adapted to be secured in adjusted position in any suitable manner. It will be apparent that with the clutch members 30, 36 thrown in, the rotation of the shaft 66 will cause the carriage 252 to be moved along longitudinally of said shaft in the direction of the bracket strip 12, so that at a given time the extension 260 of said carriage will abut against the collar 264 and thus move the rod 262 and collar 32 to disengage the clutch members 30, 36. It will be apparent that by securing the collar 264 in the required adjusted position upon the rod 262, the tilting movement of the body can be arrested at any desired time. On the other hand, when the clutch members 28 and 34 are thrown in, the consequent rotation of the shaft 66 in the reverse direction will move the carriage 252 toward the outer end of the shaft 66 and the abutment 260 encountering the collar 266 will move the rod 262 to disengage the clutch members 28, 34. By securing the collar 266 in the required position upon the rod 262, downward movement of the body can be arrested when it has reached its normal lowered position.

One form of mechanism for turning the body to enable the load to be discharged from either side of the vehicle will now be described, it being understood that the invention is not to be considered as limited in any way, shape or manner to the specific arrangement or detail shown.

Referring more particularly to Figs. 1, 8 and 9, there is mounted upon the shaft 6 a sprocket wheel 268 from which a second sprocket wheel 270 mounted upon one end of a stud shaft 272 is driven through a sprocket chain 274. The stud shaft 272 is mounted in a bearing 276 carried by the bracket strip 12 and has secured upon its opposite end a sprocket wheel 278 which, by means of a sprocket chain 280, drives another sprocket wheel 282 mounted upon the forward end of a shaft 284. The shaft 284 is mounted in suitable bearings 286, 286 secured to the bracket strips 12 and 26, respectively, and upon said shaft are loosely mounted two clutch members 288, 290, and intermediate said clutch members there is splined upon said shaft a collar 292 in such manner that said collar is compelled to rotate with said shaft but is capable of longitudinal movement thereon. Said collar 292 is provided with two clutch members 294, 296, the former of which is adapted to coöperate with the clutch member 290 and the latter of which is adapted to coöperate with the clutch member 288. The collar 292 carries an annular groove 298 engaged by studs 300 provided on the ends of the arms of a yoke 302 fixed to a shaft 304 mounted for rotary movement in a bearing 306 secured to the bracing bar 48 of the frame and also in a bearing 308 upon one of two standards 50 secured upon the angle irons 2 of the chassis. To the outer end of the shaft 304 there is secured a handle 310. The clutch member 290 is provided with a sprocket wheel 312 preferably integral therewith, and the clutch member 288 is provided with a gear 314 also preferably integral therewith. A shaft 316 extends longitudinally of the machine parallel to the shaft 284, said shaft 316 being mounted for rotary movement in brackets secured in any suitable manner to the under side of bracket strips 12, 26 and U-irons 70, 72. Upon said shaft 316 is rigidly mounted a sprocket wheel 318 driven by the sprocket wheel 312 by a sprocket chain 320, and said shaft 316 is also provided with a gear 322 which is in mesh with the gear 314 of the clutch member 288. Adjacent its inner end, the shaft 316 is provided with a sprocket wheel 324, see Figs. 1 and 4, which is operatively connected by means of a sprocket chain 326 with a sprocket wheel 328 rigidly mounted upon a shaft 330 mounted above the shaft 80 in bearings provided in the bracket 82 and bracket 86, respectively. Upon the inner end of the shaft 330 is rigidly mounted a beveled gear 332 which is in mesh with a beveled gear 334 provided on the disk 124 which is mounted for rotative movement upon the shaft 98 and which carries the upper member 114 of the turn table all as hereinbefore described.

It will be apparent that if by means of the handle 310 the shaft 304 be turned in one direction the clutch members 294, 290 will be brought into engagement, and that thereupon the shaft 316 will through the sprocket wheel 268, sprocket chain 274, sprocket wheel 270, shaft 272, sprocket wheel 278, sprocket chain 280, shaft 284, clutch members 294, 290, sprocket wheel 312, sprocket chain 320 and sprocket wheel 318, receive rotative movement from the main shaft of the machine, and that said rotative movement will be communicated from the shaft 316 to the disk 124 and body sustained thereby through the sprocket wheel 324, sprocket chain 326, sprocket wheel 328, shaft 330 and beveled gears 332, 334. When the body has been turned sufficiently to enable the load to be discharged from the side of the vehicle, the collar 292 can be thrown into its neutral intermediate position to bring the clutch member 294 out of engagement with the clutch member 290 without bringing the clutch member 296 into engagement with the clutch member 288, rotation of the body being thus arrested.

It will be apparent that by swinging the handle 310 in the opposite direction to that necessary to cause the clutch members 290 and 294 to engage, the clutch member 296 can be brought into engagement with the clutch member 288 which, through the same connections above described between the main shaft 6 and shaft 284 and the shaft 316 and disk 124, will cause the turn table and body to be turned in the opposite direction to that in which they are turned when the clutch members 290 and 294 are in engagement.

It will be noted that the body can be turned to enable the load to be discharged from either side of the vehicle and back again to bring the body into its normal longitudinal position above the chassis.

Suitable locking means for maintaining the clutch members 294 and 296 in their operative or inoperative relation with regard to the clutch members 290 and 288, respectively, is herein provided, said means in the embodiment of the invention shown, comprising collar 336, spring 338, tooth 340 and notches 342 of a construction and mode of operation similar in all respects to the corresponding parts 154, 156, 148, 150, 152 and 146, hereinbefore described in connection with the operation of the clutch members 28, 34, 36 and 30.

Both the hoisting or tilting mechanism and the mechanism for effecting rotation of the body are driven from a common shaft which in the present instance is the driving shaft of the engine. It will be apparent, however, that instead of being power driven, this shaft could be operated manually if desired. It will also be noted that owing to the particular arrangement and construction of the mechanism in accordance with this invention, the hoisting or tilting of the body and the turning movement of the body may take place simultaneously, or one at a time, in any order desired. The tilting movement may be effected in any angular position of the body, that is to say, at any time of the turning movement of the body, and on the other hand the body may be turned at any time during the tilting movement. It will be noted also that the turning movement of the body is effected concentrically to the shaft that operates the tilting movement. The two operations may be entirely independent, neither affecting the other. All parts of the body are always maintained at such a height that the body can be turned with the body tilted to any degree. Rotary movement of the body can commence as soon as the body has been sufficiently raised to clear the upturned ends 168 of the bar 166 which contribute to holding the body against lateral displacement when in its lowered position.

It will be apparent to those skilled in the art that vehicles constructed in accordance with the present invention possess many advantages other than those specifically referred to. It will also be apparent that it is not indispensable that all of the features of the invention be used conjointly since they may be used to advantage separately in various combinations and sub-combinations. It will also be understood that while the invention is herein described as embodied in the details illustrated, the invention is not to be considered as circumscribed by or limited to these details, or any of them, the said details may be variously modified within the true scope of the invention which is definitely set forth by the claims.

Claims:

1. A dumping motor vehicle including, in combination, a body; a chassis on which said body is rotatable; an engine shaft through which said vehicle is propelled; mechanism for raising and tilting said body relatively to said chassis; mechanism for rotating said body on said chassis; and intermediate connections between each of said mechanisms and said engine shaft for actuating both of said mechanisms at will from said shaft.

2. A dumping motor vehicle including, in combination, a chassis; a turn-table mounted thereon; a body carried by said turn-table; an engine shaft through which said vehicle is propelled; body raising and tilting means supported by said turn-table and turning therewith; a shaft operatively connected with said last-named means and journaled concentric with said turn-table; driving connections between said last-named shaft and said engine shaft; means for turning said turn-table including a member concentric therewith; and driving connections between said member and said engine shaft.

3. A load handling apparatus including, in combination, a body; a suitable support on which said body is sustained; mechanism for raising said body upon said support; mechanism for turning said body upon said support; a common actuator for said body raising and body turning mechanisms; means operatively and selectively to connect said body turning mechanism and said body raising mechanism with said common actuator; and means automatically to arrest the operation of said body raising mechanism when the body has been raised to the desired height.

4. A load handling apparatus including, in combination, a body; a suitable support on which said body is sustained; mechanism for raising said body upon said support; mechanism for turning said body upon said support; a common actuator for said body raising and body turning mechanisms; clutch mechanism and operating means therefor operatively to connect said common actuator and said body raising mechanism; clutch mechanism and operating means therefor operatively to connect said common actuator and said body turning mechanism; and means automatically to throw out the clutch that connects said common actuator and said body raising mechanism when the body has reached a predetermined height.

5. A load-handling apparatus comprising, in combination, a suitable support; a turn-table mounted thereon; a frame supported on said turn-table; a load-supporting body normally resting on said frame; a plurality of inclined guide rails on said frame; a plurality of corresponding rolls carried by said body and adapted to coöperate with said guide-rails, respectively; a pair of inclined guide-rails on said frame; a pair of push-bars pivotally attached at one pair of ends to said body; a pair of rollers journaled on the other pair of ends of said push-bars and adapted to coöperate with the rails of said pair; a second pair of rollers journaled on said push-bars intermediate their ends and adapted to coöperate with the rails of said pair; a pair of grooved rollers journaled on said push-bars, respectively; a pair of cables attached at one pair of ends to said frame and having bights engaging said grooved rollers, respectively; a pair of cable-winding drums to which the other pair of ends of said cables are secured, said drums being journaled on said frame; a pair of gears on said drums, respectively; a pinion meshing with said gears; a shaft to which said pinion is secured, said shaft being journaled in a suitable bearing on said frame concentric with said turn-table; and means for rotating said shaft including a gear secured thereto; and means for turning said turn-table including a gear secured to said frame concentric with said turn-table.

6. A load-handling apparatus comprising, in combination, a suitable support; a load-supporting body; a guide rail carried by one of said parts; a push-bar pivotally attached at one end to the other of said parts; a roller journaled on the other end of said push-bar and adapted to coöperate with said guide-rail; a second roller journaled on said push bar intermediate its ends and adapted to coöperate with said guide-rail; a cable connected to said push-bar; and winding means for said cable.

7. A load-handling apparatus comprising, in combination, a suitable support; a frame supported thereby; a load-supporting body normally resting on said frame; a pair of inclined guide rails on said frame; a pair of push bars pivotally attached at one pair of ends to said body; a pair of rollers journaled on the other pair of ends of said push bars and adapted to coöperate with said pair of rails; a second pair of rollers journaled on said push bars intermediate their ends and adapted to coöperate with said pair of rails; a pair of cables operatively connected to said push bars; a pair of cable winding drums, upon which the said cables are adapted to be wound; a pair of gears on said drums, respectively; a pinion meshing with said gears; a shaft to which said pinion is secured; and means for rotating said shaft, including a gear secured thereto.

8. A load-handling apparatus comprising, in combination, a suitable support; a pair of inclined guide rails supported thereon; a load supporting body a pair of push-bars pivotally attached at one pair of ends to said body; a pair of rollers journaled on the other pair of ends of said push-bars and adapted to coöperate with said guide-rails; a second pair of rollers journaled on said push bars intermediate their ends and adapted to coöperate with said guide-rails; a pair of cables connected to said push-bars; and winding means for said cables.

9. A load-handling apparatus comprising, in combination, a suitable support, a load-supporting body; devices connecting said support and body permitting said body to turn about a vertical axis and to tilt to dump its load; and means on said support in addition to said devices for supporting said body; said body being normally located with its center of gravity intermediate said last-named supporting means and said vertical axis, and mechanism for moving said body longitudinally to bring said center of gravity into alinement with said axis and for thereafter tilting said body.

10. A load-handling apparatus comprising, in combination, a suitable support; a load-supporting body; devices connecting said support and body permitting said body to turn about a vertical axis and to tilt to dump its load; said body being normally located with its center of gravity eccentric to said vertical axis; and means for moving said body longitudinally to bring its center of gravity into alinement with said axis and for thereafter tilting said body.

11. A load-handling apparatus comprising, in combination, a suitable support; a load-supporting body mounted to tilt on said support; an angular push-bar pivoted to said body; rollers carried by said push-bar adjacent the several angles thereof; an inclined guide-rail carried by said support and engaged by said rollers successively as said push-bar is swung on its pivot; and means for swinging said push-bar.

12. A load-handling apparatus comprising, in combination, a suitable support; a load-supporting body; means for raising one end of said body; a link movably engaging at its upper end the opposite end of said body, and having its lower end pivoted at a fixed point to said support; and a second link intersecting and pivoted to said first named link and movably engaging at its opposite ends said body and support, respectively.

13. A load-handling apparatus comprising, in combination, a suitable support; a load-supporting body; means for raising one end of said body; a link movably engaging at its upper end the opposite end of said body; an adjustable but normally fixed pivot for the lower end of said link connecting the same to said support; and a second link intersecting and pivoted to said first-named link and movably engaging at its opposite ends said body and support respectively.

14. A load-handling apparatus comprising, in combination, a suitable support; a load supporting body; means for raising one end of said body; a link movably engaging at its upper end the opposite end of said body and having its lower end pivoted at a fixed point to said support; a second link intersecting said first-named link and movably engaging at its opposite ends said body and support respectively; and an adjustable pivot connecting said links at their point of intersection.

15. A load-handling apparatus comprising, in combination, a suitable support; a load-supporting body; means for raising one end of said body; a link movably engaging at its upper end the opposite end of said body; a pivot bolt for the lower end of said link; said support being provided with a plurality of apertures each adapted to receive said bolt; a second link intersecting said first-named link and movably engaging at its opposite ends said body and support respectively; and a pivot bolt connecting said links at their point of intersection, each of said links being provided with a plurality of apertures each adapted to receive said last-named bolt.

In testimony whereof, I have signed my name to this specification, in the presence of two subscribing witnesses.

GUSTAF KELLGREN.

Witnesses:
 ROBERT H. KAMMLER,
 BERTHE DAVID.